United States Patent
Kawai et al.

(10) Patent No.: US 10,809,424 B2
(45) Date of Patent: Oct. 20, 2020

(54) GLASS SHEET COMPOSITE, DIAPHRAGM USING THE SAME, AND IMAGE PROJECTION STRUCTURE

(71) Applicant: AGC Inc., Chiyoda-ku (JP)

(72) Inventors: Yohei Kawai, Tokyo (JP); Jun Akiyama, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 156 days.

(21) Appl. No.: 15/938,069

(22) Filed: Mar. 28, 2018

(65) Prior Publication Data

US 2018/0284328 A1 Oct. 4, 2018

(30) Foreign Application Priority Data

Mar. 29, 2017 (JP) ................. 2017-065976

(51) Int. Cl.
- *G02B 5/02* (2006.01)
- *B32B 17/06* (2006.01)
- *G10K 13/00* (2006.01)

(52) U.S. Cl.
CPC ............ *G02B 5/0242* (2013.01); *B32B 17/06* (2013.01); *G10K 13/00* (2013.01)

(58) Field of Classification Search
CPC ....... B32B 17/06; G02B 5/0242; G10K 13/00
See application file for complete search history.

(56) References Cited

U.S. PATENT DOCUMENTS

| | | |
|---|---|---|
| 2010/0215930 A1 | 8/2010 | Delatte |
| 2018/0162091 A1* | 6/2018 | Takeda ...................... B32B 7/02 |
| 2019/0030862 A1* | 1/2019 | Akiyama .................. B32B 7/12 |

FOREIGN PATENT DOCUMENTS

| JP | 5057342 | 10/2012 |
|---|---|---|

OTHER PUBLICATIONS

Olivier Mal, et al., "A Novel Glass Laminated Structure for Flat Panel Loudspeakers," Audio Engineering Society, Convention Paper, May 2008, pp. 1-6.

* cited by examiner

*Primary Examiner* — Cheng Yuan Huang
(74) *Attorney, Agent, or Firm* — Oblon, McClelland, Maier & Neustadt, L.L.P.

(57) ABSTRACT

A glass sheet composite includes a first glass sheet; a second glass sheet; and a liquid layer sandwiched between the first glass sheet and the second glass sheet. The glass sheet composite has a loss coefficient greater than or equal to $1 \times 10^{-2}$ at 25° C., and an acoustic velocity of longitudinal wave greater than or equal to $5.0 \times 10^3$ m/s in a sheet thickness direction at 25° C. The liquid layer has a viscous coefficient of $1 \times 10^{-4}$-$1 \times 10^3$ Pa·s at 25° C., and a surface tension of 15-80 mN/m at 25° C. The liquid layer contains particles whose mean particle diameter is 0.3-1 µm.

10 Claims, 3 Drawing Sheets

GLASS SHEET COMPOSITE, DIAPHRAGM USING THE SAME, AND IMAGE PROJECTION STRUCTURE

CROSS-REFERENCE TO RELATED APPLICATIONS

This application is based upon and claims the benefit of prior to Japanese Application No. 2017-065976, which was filed Mar. 29, 2017.

FIELD OF THE INVENTION

The present invention relates to a glass sheet composite, a diaphragm using the glass sheet composite, and an image projection structure.

BACKGROUND OF THE INVENTION

Generally, corn paper or resin has been used as a diaphragm for a loudspeaker or a microphone. These materials have high loss coefficients, in which resonance vibrations are hardly generated, and hence, are regarded as having good sound reproduction performance in the audible range.

However, since the acoustic velocity is low in either of these materials, when the material is excited to vibrate at a high frequency, the vibration of the material may not instantly follow the sound wave frequency, and divided vibration tends to be generated. Therefore, it is difficult to output desired sound pressure especially in a high-frequency range.

In recent years, a range required to be reproduced especially for a high-resolution sound source or the like is a high-frequency range greater than or equal to 20 kHz. Although this range is considered to be barely audible to human ears, it is desirable to reproduce sound wave vibration in this range with high fidelity because the sense of presence is felt strongly, which appeals to the listener's feelings even further.

Thereupon, materials have been examined that have a high acoustic velocity when propagating in the materials, such as metal, ceramics, and glass, to be used as substitutes for corn paper and resin (see, for example, NPL1). However, these materials generally have smaller loss coefficients compared to paper, which are about $1/10$ to $1/100$ times the loss coefficient of paper; and thereby, unintended reverberant sound tends to remain. Furthermore, when a member formed of such a material is excited to vibrate at its characteristic frequency, a resonance mode may be generated, which may result in a noticeable deterioration of sound tone.

BACKGROUND ART DOCUMENTS

[Non Patent Literature] Olivier Mal et. al., "A Novel Glass Laminated Structure for Flat Panel Loudspeakers", AES Convention 124, 7343)

SUMMARY OF THE INVENTION

Problem the Invention is to Solve

Here, the inventors had considered that if there were a device in which glass has highly integrated functions of both a loudspeaker capable of emitting sound with good reproducibility, and an image display utilizing the transparency of the glass, the device would dramatically increase effects of advertising and publicity etc. However, there has been no such device so far.

Thus the object of the present invention is to provide a glass sheet composite that has good acoustic performance, color tone reproducibility, transparency, and light scattering, and an excellent screen function; and a diaphragm and an image projection structure that use the glass sheet composite.

Means for Solving the Problem

As a result of intensive research, the inventors found that the above problem can be solved by a glass sheet composite having a predetermined configuration, and thus, completed the research as described in the present invention.

Embodiments of the present invention are summarized as follows:

<1> A glass sheet composite includes a first glass sheet; a second glass sheet; and a liquid layer sandwiched between the first glass sheet and the second glass sheet. The glass sheet composite has a loss coefficient greater than or equal to $1 \times 10^{-2}$ at 25° C., and an acoustic velocity of longitudinal wave greater than or equal to $5.0 \times 10^3$ m/s in a sheet thickness direction at 25° C. The liquid layer has a viscous coefficient of $1 \times 10^{-4}$-$1 \times 10^3$ Pass at 25° C., and a surface tension of 15-80 mN/m at 25° C. The liquid layer contains particles whose mean particle diameter is 0.3-1 μm.

<2> The glass sheet composite as described in <1>, in which the liquid layer further contains a medium, and a difference between a refractive index of the medium and a refractive index of the particles is greater than or equal to 0.15.

<3> The glass sheet composite as described in <1> or <2>, in which a volume ratio of the particles is 0.1-5 vol % when an entirety of the liquid layer in volume is taken as 100 vol %.

<4> The glass sheet composite as described in one of <1> to <3>, in which the particle is a particle having an anisotropic shape.

<5> The glass sheet composite as described in one of <1> to <4>, in which the particles are particles selected from the group consisting of hollow particles, porous particles, and a mixture thereof.

<6> The glass sheet composite as described in one of <1> to <5>, in which the liquid layer further contains a light absorbing material.

<7> The glass sheet composite as described in one of <1> to <6>, in which a surface of at least one of the first glass sheet and the second glass sheet has a rugged structure.

<8> A diaphragm includes the glass sheet composite as described in one of <1> to <7>; and a vibrating element.

<9> An image projection structure includes the glass sheet composite as described in one of <1> to <7>.

<10> An image projection structure includes the diaphragm as described in <8>.

Advantages of the Invention

The glass sheet composite of the present invention includes a first glass sheet, a second glass sheet, and a liquid layer sandwiched between the first glass sheet and the second glass sheet, in which the loss coefficient and the acoustic velocity of longitudinal wave of the glass sheet composite, and the viscous coefficient and the surface tension of the liquid layer are set in the specific ranges, and particles having specific mean particle diameter are contained in the liquid layer. Therefore, it is possible to provide a glass sheet composite that has good acoustic performance, has good color tone reproducibility, transparency, and light scattering, and excels in a screen function; and a diaphragm and an image projection structure that use the glass sheet composite.

MODE FOR CARRYING OUT THE INVENTION

Figure 1:
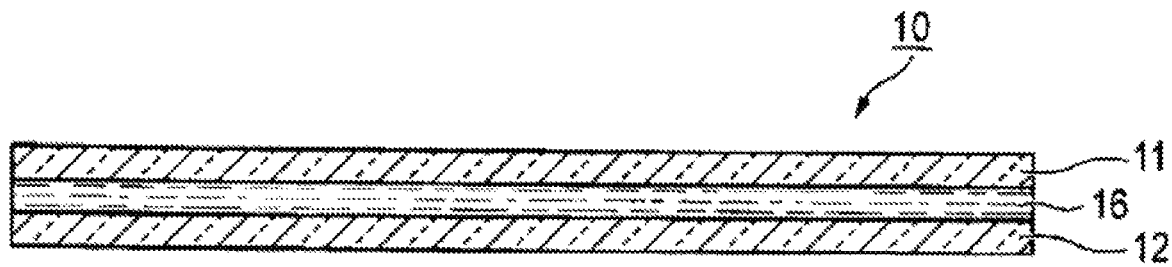
FIG. 1 is a cross-sectional view illustrating an example of a glass sheet composite in the present invention.

In the following, based on embodiments, details and features will be described. Note that the same or corresponding reference numerical is assigned to the same or corresponding members or parts throughout the drawings, to omit duplicated description. Also, unless especially specified, it is not an object of the drawings to show relative ratios among members or parts. Therefore, specific dimensions may be properly selected according to the following non-limiting embodiments.

Also, "-" designating a numerical range in the present invention is used for meaning that numerical values appearing before and after "-" specify the lower limit and the upper limit, respectively.

<Glass Sheet Composite>

Features of a glass sheet composite according to the present invention include: having a first glass sheet, a second glass sheet, and a liquid layer sandwiched between the first glass sheet and the second glass sheet; having a loss coefficient greater than or equal to $1 \times 10^{-2}$ at 25° C.; and having an acoustic velocity of longitudinal wave that is greater than or equal to $5.0 \times 10^3$ m/s in a sheet thickness direction at 25° C. Note that a high loss coefficient means that vibration damping capability is high.

As the loss coefficient, a value calculated by a half-power range width method is used. The loss coefficient is defined to be a value represented by {W/f} where f represents the resonance frequency of a material, and W represents a frequency width between points decreased by −3 dB from the peak value as the amplitude h (namely, points at the maximum amplitude −3 dB). In order to inhibit the resonance, the loss coefficient may be set higher; namely, the frequency width W becomes relatively broader with respect to the amplitude h, which means that the peak becomes broader.

The loss coefficient is a characteristic value of a material, for example, in the case of a simplex glass sheet, the loss coefficient may vary depending on the composition, the relative density, and the like. Note that the loss coefficient can be measured by a testing method of dynamic modulus of elasticity, such as a resonance method.

The acoustic velocity of longitudinal wave means a velocity at which a longitudinal wave propagates in a diaphragm. The acoustic velocity of longitudinal wave, and Young's modulus can be measured by an ultrasonic pulse method described in a Japanese Industrial Standard (JIS-R1602-1995).

As a specific configuration for obtaining a high loss coefficient and a high acoustic velocity of longitudinal wave, a glass sheet composite according to the present invention includes two glass sheets constituted with a first glass sheet and a second glass sheet, and also includes a predetermined liquid layer sandwiched between the pair of glass sheets.

(Liquid Layer)

The glass sheet composite according to the present invention can realize a high loss coefficient by providing a layer formed of liquid (liquid layer) between the first glass sheet and the second glass sheet. Furthermore, setting the viscosity and the surface tension of the liquid layer in suitable ranges enables to further raise the loss coefficient. Unlike the case where the first glass sheet and the second glass sheet are provided via an adhesion layer, his is considered because the pair of glass sheets is not bonded together, and thus each of the glass sheets to continue exhibiting its own vibration characteristic.

Also, since the liquid layer include particles whose mean particle diameter is 0.3-1 μm, the glass sheet composite can have a screen function that excels in color tone reproducibility, transparency, and light scattering.

The viscous coefficient of the liquid layer is $1 \times 10^{-4}$-$1 \times 10^3$ Pa·s at 25° C. It is more favorable that the viscous coefficient of the liquid layer at 25° C. is greater than or equal to $1 \times 10^{-3}$ Pa·s, even more favorable to be greater than or equal to $1 \times 10^{-2}$ Pa·s. It is also more favorable to be less than or equal to $1 \times 10^2$ Pa·s, and even more favorable to be less than or equal to $1 \times 10$ Pa·s.

If the viscosity of the liquid layer is too low, transmitting vibration becomes difficult. If it is too high, the first glass sheet and the second glass sheet positioned on both sides of the liquid layer tend to bond with each other, and start exhibiting a vibration behavior as a simplex glass sheet, which makes it difficult to damp the resonance vibration. The viscous coefficient of the liquid layer can be measured by a rotational viscometer or the like.

The surface tension of the liquid layer is 15-80 mN/m at 25° C. It is favorable that the surface tension of the liquid layer at 25° C. is greater than or equal to 20 mN/m, and is more favorable to be greater than or equal to 30 mN/m. It is also favorable to be less than or equal to 75 mN/m, and is more favorable to be less than or equal to 73 mN/m.

If the surface tension of the liquid layer is too low, the adhesion force between the glass sheets decreases, and transmitting vibration becomes difficult. If the surface tension of the liquid layer is too high, the first glass sheet and the second glass sheet positioned on both sides of the liquid layer tend to bond with each other, and start exhibiting a vibration behavior as a simplex glass sheet, which makes it difficult to damp the resonance vibration. The surface tension of the liquid layer can be measured by a ring method or the like.

As particles used in the liquid layer, from the viewpoint of improving the screen function by improving light scattering such as front light scattering, particles having anisotropic shapes, such as sheet shapes and rod shapes, are favorable. It is favorable that anisotropic particles account for greater than or equal to 50 vol % with respect to all the particles, more favorable to account for greater than or equal to 65 vol %, and even more favorable to account for greater than or equal to 80 vol %. In the case of particles having non-spherical shapes, for example, having sheet shapes, the aspect ratio of the particles is favorably greater than or equal to 5 and less than or equal to 5000, and more favorably greater than or equal to 10 and less than or equal to 1000.

Also, from the viewpoint of compatibility between the light scattering and the transparency, it is further favorable that particles used in the liquid layer are selected from among hollow particles, porous particles, and a mixture thereof. It is favorable that the particles chosen from among hollow particles, porous particles, and a mixture thereof account for greater than or equal to 50 vol % of all the particles, more favorable to occupy greater than or equal to 65 vol %, and even more favorable to occupy greater than or equal to 80 vol %.

The hollow particles are not especially limited as long as the effects of the present invention are not impaired, and include, for example, inorganic hollow particles that are formed of metal oxides such as silica, alumina, titania, and zirconia, and glass; organic hollow particles formed of styrene-based resin, acrylic-based resin; and hollow particles formed of a hybrid material of an inorganic substance and an organic substance.

The porous particles are not especially limited as long as the effects of the present invention are not impaired, and include, for example, inorganic porous particles formed of metal oxides such as silica, alumina, titania, and zirconia, and glass; organic porous particles formed of styrene-based resin, acrylic-based resin.

It is possible to mix hollow particles and porous particles and to use the mixture if necessary.

The mean particle diameter of the particles used in the liquid layer is 0.3-1 µm. The mean particle diameter in the present invention means the diameter of primary particles if the particles are monodispersed, or means the diameter of secondary aggregates of particles if aggregates of the particles are dispersed. When the mean particle diameter is greater than or equal to 0.3 µm, the color tone reproducibility and the light scattering are improved, and when the mean particle diameter is less than or equal to 1 µm, dispersion stability of the particles is improved.

It is favorable that the mean particle diameter of the particles used in the liquid layer is greater than or equal to 0.4 µm, and is more favorable to be greater than or equal to 0.8 µm. It is also favorable to be less than or equal to 0.9 µm, and is more favorable to be less than or equal to 0.8 µm. Note that the mean particle diameter is measured in the following manner: the particles are observed by a scanning electron microscope to randomly select 100 particles, and the sum of the major axes of the selected 100 particles is divided by the number of particles to obtain an average value.

It is favorable that the volume ratio of the particles used in the liquid layer is 0.1 to 5 vol % when the entire liquid layer is taken as 100 vol %. Setting the volume ratio to be greater than or equal to 0.1 vol % can improve the light scattering and can favorably realize the effects of the present invention. Note that it is favorable to set the volume ratio to be less than or equal to 5 vol % because the dispersion stability becomes good. Also, if the volume ratio falls within the range described above, no adverse influence will be given to the acoustic performance of the glass sheet composite.

It is more favorable that the volume ratio is greater than or equal to 0.3 vol %, and even more favorable to be greater than or equal to 0.5 vol %. It is also more favorable that the volume ratio is less than or equal to 4 vol %, and even more favorable to be less than or equal to 3 vol %.

The liquid layer in the present invention may further contain a medium. Specifically, the medium may include, for example, water, oil, organic solvent, liquefied polymer, ionic liquid, and a mixture thereof.

More specifically, the medium may be, for example, propylene glycol, dipropylene glycol, tripropylene glycol, straight silicone oil (e.g., dimethyl silicone oil, methyl phenyl silicone oil, and methyl hydrogen silicone oil), denatured silicone oil, acrylic acid-based polymer, liquid polybutadiene, glycerin paste, fluorine-based solvent, fluorine-based resin, acetone, ethanol, xylene, toluene, water, mineral oil, and a mixture thereof.

Among these, it is favorable for the medium to contain at least one selected from the group consisting of water, propylene glycol, dimethyl silicone oil, methylic phenyl silicone oil, methylic hydrogen silicone oil, and denatured silicone oil. It is more favorable to contain water, propylene glycol, or silicone oil as a main component.

It is favorable that the volume ratio of the medium in the liquid layer is greater than or equal to 95 vol % when the entire liquid layer is taken as 100 vol %, and is more favorable to be greater than or equal to 97 vol %. It is also favorable to be less than or equal to 99.9 vol %, and is more favorable to be less than or equal to 99.7 vol %.

Note that in the present invention, it is favorable that the difference between the refractive index of the medium and the refractive index of the particles is greater than or equal to 0.15 (in the absolute value). It is more favorable to be greater than or equal to 0.5, and even more favorable to be greater than or equal to 0.7. It is also favorable to be less than or equal to 2, more favorable to be less than or equal to 1.5, and even more favorable to be less than or equal to 1.2. Providing such a refractive index difference enables, for example, to improve the transparency when the glass sheet composite in the present disclosure is used as a transmission-type screen and the screen is turned off (referred to as "off-transparency", below).

Note that if it is desired to improve image clarity when the screen is turned on, it is favorable that the difference between the refractive index of the medium and the refractive index of the particles (in the absolute value) is greater than or equal to 0.7, more favorable to be greater than or equal to 0.8, and even more favorable to be greater than or equal to 1. Also, improvement of the image clarity is specifically based on improvement of the light scattering characteristic.

Especially, in the present invention, if hollow particles or porous particles are used as particles in the liquid layer, the medium permeates the holes of these particles to make the difference between the refractive indices smaller while the light scattering based on the mean particle diameter is maintained. This enables to achieve compatibility between the transparency when the screen is turned off, and the image clarity when the screen is turned on.

The liquid layer in the present invention may further contain a light absorbing material. Containing a light absorbing material enables to inhibit emission of outside light from an unnecessary part, which would otherwise cause a phenomenon of reducing the contrast of an image and/or the background, and to thereby maintain a good visibility.

The light absorbing material may include, for example, as an inorganic coloring material, a carbon-based material (e.g., carbon black, nano-diamond, fullerene, carbon nanotube, carbon nanohorn, and graphene); black titanium oxide; black silica; and a fine-particle material mainly containing silver (e.g., nitride, sulfide, and oxide of silver). Also, an organic coloring material may include, for example, organic pigment, organic dyestuff.

Two or more light absorbing materials may be mixed to adjust the color tone. It is favorable to use an inorganic coloring material or an organic pigment as the light absorbing material from the viewpoint of durability. Inorganic coloring materials and organic coloring materials are typical particles.

From the viewpoint of improving the contrast, it is favorable that the volume ratio of the light absorbing material is greater than or equal to 0.01 vol % the entire liquid layer is taken as 100 vol %, and more favorable to be greater than or equal to 0.05 vol %. It is also favorable to be less than or equal to 10 vol %, and more favorable to be less than or equal to 5 vol %.

If the vapor pressure of the liquid layer is too high, there is a likelihood that the liquid layer evaporates, and the glass sheet composite stops functioning as expected. Therefore, it is favorable that the vapor pressure of the liquid layer at 25° C. and 1 atm is less than or equal to $1\times10^4$ Pa, more favorable to be less than or equal to $5\times10^3$ Pa, and even more favorable to be less than or equal to $1\times10^3$ Pa. The lower limit is not particularly limited, and may normally be greater than or equal to $1\times10^2$ Pa. Also, if the vapor pressure is high, sealing or the like may be applied so as to prevent the liquid layer from evaporating. In this case, it is necessary not to hinder the glass sheet composite from vibrating by the sealing material.

From the viewpoints of maintaining high rigidity and vibration transfer, it is more favorable for the thickness of the liquid layer to be thinner. Specifically, when the total thickness of the first glass sheet and the second glass sheet is less than or equal to 1 mm, it is favorable that the thickness of the liquid layer is less than or equal to 1/10 of the total thickness of the first glass sheet and the second glass sheet, more favorable to be less than or equal to 1/20, even more favorable to be less than or equal to 1/30, furthermore favorable to be less than or equal to 1/50, particularly favorable to be less than or equal to 1/70, and especially favorable to be less than or equal to 1/100.

Also, when the total thickness of the first glass sheet and the second glass sheet is greater than 1 mm, it is favorable that the thickness of the liquid layer is less than or equal to 100 μm, more favorable to be less than or equal to 50 μm, even more favorable to be less than or equal to 30 μm, furthermore favorable to be less than or equal to 20 μm, particularly favorable to be less than or equal to 15 μm, and especially favorable to be less than or equal to 10 μm. It is favorable for the lower limit of the thickness of the liquid layer to be greater than or equal to 0.01 μm from the viewpoints of film forming and durability.

It is favorable for the liquid layer to be chemically stable, and not to react with the first glass sheet and the second glass sheet that are positioned on both sides of the liquid layer. Being "chemically stable" means, for example, that little degeneration (deterioration) is caused by light irradiation, and at least in a temperature range of −20 to 70° C., no solidification, evaporation, decomposition, discoloration, and chemical reaction with glass occurs.

From the viewpoints of design and functionality, the liquid layer may also contain a fluorescent material. Accordingly, it is possible to have the glass sheet composite provided with optical functions such as light absorption and light emission.

(Glass Plate)

As illustrated in FIG. 1, a glass sheet composite (10) according to the present invention includes a first glass sheet 11; a second glass sheet 12; and a liquid layer (16) sandwiched between the first glass sheet 11 and the second glass sheet 12. Referring to one glass sheet as the first glass sheet (11) and another glass sheet as the second glass sheet (12), when the first glass sheet resonates, existence of the liquid layer can prevent the second glass sheet from resonating, or can damp vibration caused by the resonance of the second glass sheet. Thus, a higher loss coefficient can be realized in the glass sheet composite compared to the case of a simplex glass sheet.

It is favorable that the peak top value of the resonance frequency of the first glass sheet is different from the peak top value of the resonance frequency of the second glass sheet, and it is more favorable that respective ranges of resonance frequencies do not overlap each other. However, even if the respective ranges of resonance frequencies of the first glass sheet and the second glass sheet overlap each other, or the peak top value is the same, existence of the liquid layer prevents the vibration of the other glass sheet from synchronizing when the one glass sheet resonates, and cancels the resonance to a certain extent. Therefore, compared with the case of a simplex glass sheet, it is possible to obtain a higher loss coefficient.

The thinner the thickness of the first glass sheet and the second glass sheet is, the easier the glass sheets stick each other via the liquid layer, and the less energy is required to vibrate the glass sheets. Therefore, in the case of using the glass sheets as a diaphragm of a loudspeaker or the like, it is more favorable to make the thickness of the glass sheets thinner.

Specifically, it is favorable that the sheet thickness of each of the first glass sheet and the second glass sheet is less than or equal to 15 mm, more favorable to be less than or equal to 10 mm, even more favorable to be less than or equal to 5 mm, furthermore favorable to be less than or equal to 3 mm, especially favorable to be less than or equal to 1.5 mm, and more especially favorable to be less than or equal to 0.8 mm. On the other hand, if the sheet thickness is too thin, surface defects of the glass sheet tend to have noticeable effects such that a crack may occur more easily, or a strengthening treatment may become difficult to apply. Therefore, it is favorable that the sheet thickness is greater than or equal to 0.01 mm, and more favorable to be greater than or equal to 0.05 mm.

In addition, in the case of using the glass sheets as an image projection structure such as a sound screen, in order to prevent double images caused by reflection on the glass surface and on the liquid layer surface, and to maintain the housing shape, it is favorable that the sheet thickness of each of the first glass sheet and the second glass sheet is greater than or equal to 0.1 mm, more favorable to be greater than or equal to 0.3 mm, and even more favorable to be greater than or equal to 0.5 mm. It is also favorable to be less than or equal to 5 mm, more favorable to be less than or equal to 3 mm, and even more favorable to be less than or equal to 1.5 mm.

It is favorable when used in a diaphragm that at least one of the first glass sheet and the second glass sheet has a high loss coefficient because the glass sheet composite can obtain a greater vibration damping capability. Specifically, it is favorable that the loss coefficient of a glass sheet at 25° C. is greater than or equal to $1\times10^{-4}$, more favorable to be greater than or equal to $3\times10^{-4}$, and even more favorable to be greater than or equal to $5\times10^{-4}$. The upper limit is not particularly limited, and may normally be less than or equal to $5\times10^{-3}$ from the viewpoints of productivity and manufacturing cost.

Also, it is more favorable that both of the first glass sheet and the second glass sheet have the loss coefficient described above. Note that the loss coefficient of a glass sheet can be measured by substantially the same method as for the loss coefficient of a glass sheet composite.

Also, when used in an image projection structure, it is favorable that the loss coefficient at 25° C. of at least one of the first glass sheet and the second glass sheet is greater than or equal to $1\times10^{-4}$, more favorable to be greater than or equal to $3\times10^{-4}$, and even more favorable to be greater than or equal to $5\times10^{-4}$. The upper limit is not particularly limited, and may normally be less than or equal to $1\times10^{-3}$.

It is favorable that at least one of the first glass sheet and the second glass sheet has a high acoustic velocity of longitudinal wave in the sheet thickness direction because the sound reproducibility in a high-frequency range improves more, when used in a diaphragm.

Specifically, it is favorable that the acoustic velocity of longitudinal wave in the sheet thickness direction of the glass sheet is greater than or equal to $5.0\times10^{3}$ m/s, more favorable to be greater than or equal to $5.7\times10^{3}$ m/s, and even more favorable to be greater than or equal to $6.0\times10^{3}$ m/s. The upper limit is not particularly limited, and may normally be less than or equal to $7.0\times10^{3}$ m/s from the viewpoints of productivity and raw material cost of the glass sheet.

Also, it is more favorable that both of the first glass sheet and the second glass sheet satisfy the acoustic velocity described above. Note that the acoustic velocity in a glass sheet can be measured by substantially the same method as the acoustic velocity of longitudinal wave in a glass sheet composite.

Also, when used in an image projection structure, it is favorable that the acoustic velocity of longitudinal wave in the sheet thickness direction of at least one of the first glass sheet and the second glass sheet is greater than or equal to $5.0\times10^{3}$ m/s, more favorable to be greater than or equal to $5.7\times10^{3}$ m/s, and especially favorable to be greater than or equal to $6.0\times10^{3}$ m/s. The upper limit is not particularly limited, and may normally be less than or equal to $7.0\times10^{3}$ m/s.

The composition of the first glass sheet and the second glass sheet is not particularly limited. For example, it is favorable for it to be within the following ranges, in terms of oxide: 40 to 80 mass % $SiO_2$; 0 to 35 mass % $Al_2O_3$; 0 to 15 mass % $B_2O_3$; 0 to 20 mass % MgO; 0 to 20 mass % CaO; 0 to 20 mass % SrO; 0 to 20 mass % BaO; 0 to 20 mass % $Li_2O$; 0 to 25 mass % $Na_2O$; 0 to 20 mass % $K_2O$; 0 to 10 mass % $TiO_2$; and 0 to 10 mass % $ZrO_2$, where the above composition accounts for greater than or equal to 95 mass % of the entire glass.

It is also favorable that, in the first glass sheet and/or the second glass sheet, the surface which contacts with the liquid layer has a rugged structure. It is especially favorable that in the distal glass sheet from the viewer of the two glass sheets, the surface contacted with the liquid layer has a rugged structure. A form with this structure enables to further improve light scattering such as front light scattering. A method of forming a rugged structure can be appropriately performed by a person skilled in the art.

It is favorable that the arithmetic mean roughness Ra on the surface of the glass sheet having a rugged structure is greater than or equal to 0.3 µm (measured based on JIS B 0601:2013), more favorable to be greater than or equal to 0.5 µm, and even more favorable to be greater than or equal to 1 µm. It is also favorable to be less than or equal to 10 µm, more favorable to be less than or equal to 5 µm, and even more favorable to be less than or equal to 3 µm.

(Glass Sheet Composite)

It is favorable for the loss coefficient in a glass sheet composite to be higher because the vibration damping performance becomes higher. The loss coefficient of a glass sheet composite according to the present invention at 25° C. is favorably greater than or equal to $1\times10^{-2}$, more favorably greater than or equal to $2\times10^{-2}$, and even more favorably greater than or equal to $5\times10^{-2}$. The upper limit is not particularly limited, and may normally be less than or equal to 1.

It is also favorable that the acoustic velocity of longitudinal wave in the sheet thickness direction of the glass sheet composite is greater than or equal to $5.0\times10^{3}$ m/s because a higher acoustic velocity further improves the reproducibility of a high-frequency sound more when serving as a diaphragm; it is more favorable to be greater than or equal to $5.7\times10^{3}$ m/s, and even more favorable to be greater than or equal to $6.0\times10^{3}$ m/s. The upper limit is not particularly limited, and may normally be less than or equal to $7.0\times10^{3}$ m/s.

In order to improve the transmittance of the glass sheet composite, it is favorable that the difference between the refractive index of the first glass sheet and the second glass sheet is less than or equal to 0.2, more favorable to be less than or equal to 0.1, and even more favorable to be less than or equal to 0.01. The lower limit is not particularly limited, and may normally be greater than or equal to 0.0001.

Figure 2:
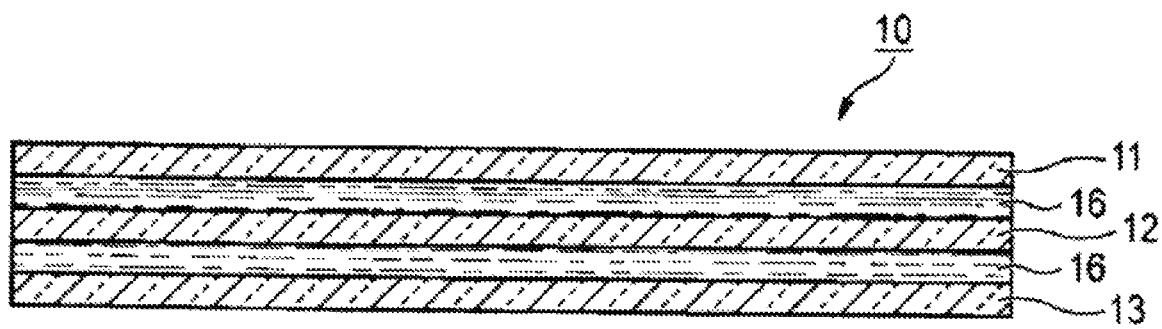
FIG. 2 is a cross-sectional view illustrating another example of a glass sheet composite in the present invention.

The number of glass sheets constituting a glass sheet composite simply needs to be two or more, and may be three or more (FIG. 2). The first glass sheet and the second glass sheet in the case of two sheets, or the first glass sheet, the second glass sheet, and a glass sheet C (13) in the case of three sheets may have compositions different from each other, or may have the same composition; alternatively, some of the sheets may have the same composition to be combined with the remaining sheet having a different composition, for use.

Among these, it is favorable to use two or more types of glass sheets having different compositions from the viewpoint of vibration damping. Also, the mass and the thickness of the glass sheets may be different from each other, may be the same, or may be partially different. Among these, it is favorable that the mass is the same for all the constituting glass sheets from the viewpoint of vibration damping capability.

As long as the effects described in the present invention are not impaired, coating or a film may be formed on at least one of the outermost surfaces of the glass sheet composite.

The glass sheet composite can be designed to have a suitable shape depending on use, and may have a plate shape or a curving shape. In order to raise the output sound pressure level in a low-frequency range, the glass sheet composite may have a structure having an enclosure or a baffle plate attached. Although the material of the enclosure or the baffle plate is not particularly limited, the glass sheet composite in the present invention may be favorably used.

Figure 3A:
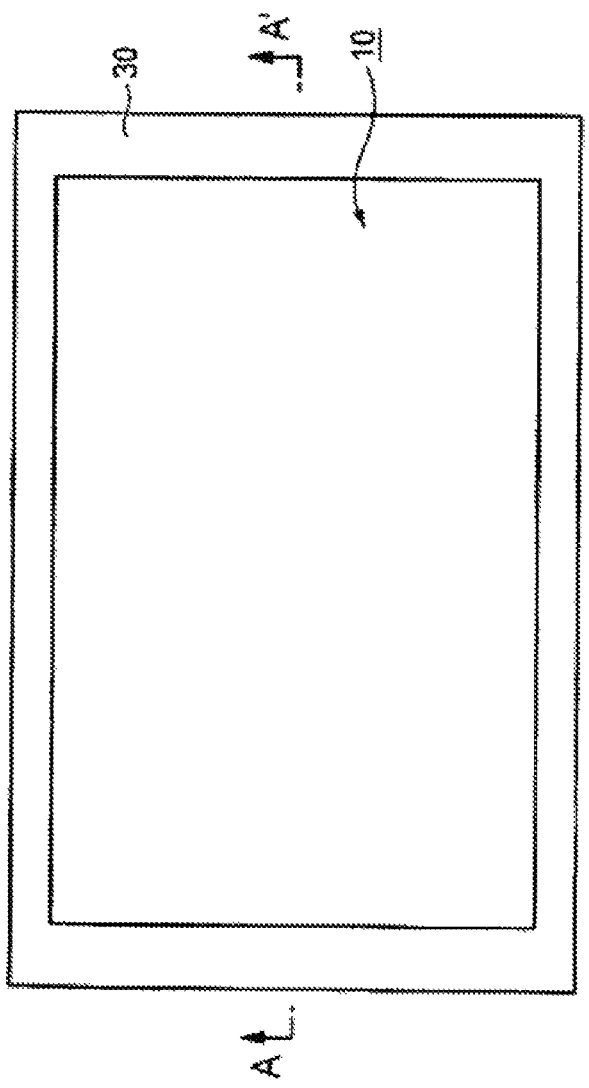
FIG. 3A is a plan view of an example of a glass sheet composite in the present invention.
Figure 3B:
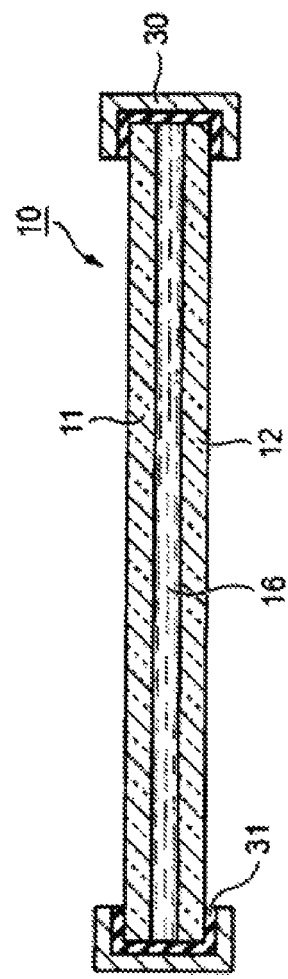
FIG. 3B is a cross-sectional view along a line A-A' in FIG. 3A.

As long as the effects of the present invention are not impaired, a frame (30) may be provided on at least one of the outermost surfaces of the glass sheet composite (FIGS. 3A-3B). The frame is useful if improvement of the rigidity of the glass sheet composite, or maintaining a curving surface shape is desired.

It is favorable that the weight of the frame to be used is less than or equal to 20% of the weight of the glass sheet, and more favorable to be less than or equal to 10%. Note that a sealing material (31) may be provided between the glass sheet composite and the frame, which enables to prevent the liquid layer from leaking through the frame.

Figure 4:
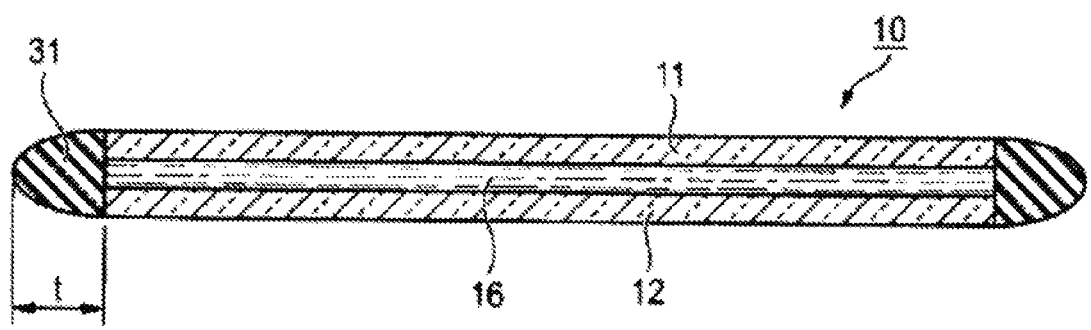
FIG. 4 is a cross-sectional view illustrating another example of a glass sheet composite in the present invention.

At least a part of outer edge surfaces of the glass sheet composite may be sealed by a member that does not hinder vibration of the glass sheet composite (FIG. 4). As the sealing material (31), for example, highly elastic rubber, resin, and gel may be listed.

If the thickness 't' of the sealing material is too thin, sufficient strength cannot be secured, and if the thickness is too thick, the vibration may be hindered. Therefore, it is favorable that the thickness of the sealing material is greater than or equal to 10 µm and less than or equal to 5 times the total thickness of the glass sheet composite, and more favorable to be greater than or equal to 50 µm and less than or equal to the total thickness of the glass sheet composite.

In order to avoid separation at the interface between the glass sheet and the liquid layer of the glass sheet composite, as long as the effects described in the present invention are not impaired, it is possible to apply the above sealing material 31 to at least a part of the surfaces of the facing glass sheets.

In this case, it is favorable that the surface area to which the sealing material is applied is less than or equal to 20% of the area of the liquid layer so as not to hinder the vibration, more favorable to be less than or equal to 10%, and especially favorable to be less than or equal to 5%.

(Method for Manufacturing Glass Sheet Composite)

A glass sheet composite according to the present invention can be obtained by forming a liquid layer between a first glass sheet and a second glass sheet. The method of forming the liquid layer between the first glass sheet and the second glass sheet is not particularly limited, and includes, for example, a method in which a liquid layer is formed on a surface of a glass sheet surface, on which another glass sheet is placed; a method in which a liquid layer is formed on each of glass sheets, which are then bonded together; and a method in which a liquid layer is poured into the gap between two glass sheets.

Also, forming the liquid layer is not particularly limited, and a method may be considered, for example, in which liquid constituting the liquid layer is applied to or sprayed on the surface of a glass sheet.

(Diaphragm)

The present invention also relates to a diaphragm that includes the above glass sheet composite and a vibrating element. The diaphragm may have, for example, one or more vibration elements or vibration detection elements (vibrating elements) installed on one or both sides of the glass sheet composite so as to be capable of functioning as a loudspeaker, a microphone, an earphone, or a housing vibrating element or a housing loudspeaker of a mobile device.

In order to raise the output sound pressure level, it is favorable to install two or more vibration elements on both sides of the glass sheet composite. Although in general, it is favorable to position the vibrating element at the central part of the composite with respect to the diaphragm, the vibrating element may be installed at an edge part of the glass sheet composite because the material has a high acoustic velocity and a high damping performance.

Uses of the diaphragm include, for example, an interior vibration member of a transportation machine such as a vehicle, an in-vehicle or in-device loudspeaker. The diaphragm may be implemented in, for example, a window glass, a ceiling, an interior panel, or the like functioning as a loudspeaker.

(Image Projection Structure)

The present invention also relates to an image projection structure including the above glass sheet composite. The image projection structure in the present invention includes a glass sheet composite in the present invention that has good acoustic performance, has good color tone reproducibility, transparency, and light scattering, and excels in a screen function. Among feasible uses, favorable uses include a reflective transparent screen that displays image light projected from a projector so as to be visually recognized by an observer located on the same side as the projector; and a transmissive transparent screen that displays image light projected from a projector so as to be visually recognized by an observer located on the opposite side to the projector.

Especially, in a form in which a reflective or transmissive transparent screen is configured to have a glass sheet composite in the present invention used as the diaphragm described above, the screen can be suitably used as what is called a "sound screen" in which image signals and audio signals are generated from the same surface.

In a form of the transmissive transparent screen, it is favorable that the haze of the screen is greater than or equal to 5%, and more favorable to be greater than or equal to 7%. It is also favorable to be less than or equal to 45%, and more favorable to be less than or equal to 35%. If the haze of the screen is greater than or equal to 5%, the screen gain and the viewing angle can be secured. If the haze of the transmissive transparent screen is less than or equal to 45%, it is possible to prevent a phenomenon in which the entire screen appears milky and cloudy.

In the present specification, "haze" means a percentage of, among transmitted light that is incident on the side of the first glass sheet (or the side of the second glass sheet) and transmitted to exit from the side of the second glass sheet (or the side of the first glass sheet), transmitted light deviated by 0.044 rad (2.5 degrees) or greater from the incident light by forward scattering. In other words, this is a normal haze measured by a method described in JIS K 7136:2000 (ISO 14782:1999). The haze represents a value measured following the method, at room temperature, and using a D65 standard light source compliant with a CIE standard specified in ISO/CIE10526.

Also, in a form of the transmissive transparent screen, it is favorable that the total light transmittance of the screen is greater than or equal to 40%, more favorable to be greater than or equal to 50%, and more favorable to be greater than or equal to 60%. If the total light transmittance of the transmissive transparent screen is greater than or equal to 40%, the screen excels in the transparency of a scene to be seen on the other side of the screen from an observer, and hence, is suitably used as a show window or the like.

In a form of the transmissive transparent screen, it is favorable that the total light transmittance of the screen is less than or equal to 95%, more favorable to be less than or equal to 90%, and even more favorable to be less than or equal to 85%. If the total light transmittance of the transmissive transparent screen is less than or equal to 85%, it is possible to prevent a phenomenon in which the entire screen appears milky and cloudy. As a result, the contrast of a scene to be seen on the other side of the screen from an observer improves, and hence, the transparency of the scene improves. Also, the contrast of an image displayed on the screen improves, and hence, the visibility of the image improves.

In the present specification, "total light transmittance" means a ratio (percentage) of transmitted light transmitted to exit from the side of the second glass sheet (or the side of the first glass sheet), to incident light that is incident on the side of the first glass sheet (or on the side of the second glass sheet) with the incident angle of 0 degrees. In other words, it is a normal total light transmittance measured by a method described in JIS K 7361:1997 (ISO 13468-1:1996), and represents a value measured with a D65 light source.

Also, in a form of the transmissive transparent screen, it is favorable that the diffuse reflectance of the screen is greater than or equal to 0.1%, and more favorable to be greater than or equal to 0.5%. It is also favorable to be less than or equal to 5%, more favorable to be less than or equal to 2.4%, and even more favorable to be less than or equal to 1.7%.

On the other hand, in a form of the reflective transparent screen, it is favorable that the total light transmittance of the screen is greater than or equal to 5% and less than or equal to 90%. In order to adequately keep the gain as a screen, it is more favorable that the total light transmittance of the visible light is less than or equal to 80%, even more favorable to be less than or equal to 70%, and especially favorable to be less than or equal to 60%. From the viewpoint of improving visibility of an outside scenery, it is more favorable that the total light transmittance of the visible light is greater than or equal to 10%, and even more favorable to be greater than or equal to 30%.

In a form of the reflective transparent screen, it is favorable that the diffuse reflectance of the screen is greater than or equal to 5%. In order to function as a screen, a higher screen gain is better. Therefore, it is more favorable that the diffuse reflectance of the screen is greater than or equal to 9%, even more favorable to be greater than or equal to 15%, and especially favorable to be greater than or equal to 30%. It is also favorable to be less than or equal to 70%, and even more favorable to be less than or equal to 60%.

In a form of the reflective transparent screen, it is favorable that the front haze of the screen is less than or equal to 20%, more favorable to be less than or equal to 15%, and even more favorable to be less than or equal to 10%. Also, from the viewpoint of compatibility with screen characteristics, it is favorable that the front haze is greater than or equal to 0.2%, more favorable to be greater than or equal to 0.5%, and even more favorable to be greater than or equal to 0.8%. In the specification, "front haze" represents transmitted light deviated from the incident light by 2.5 degrees or more among the entire transmitted light in units of percentage.

In a form of the reflective transparent screen, it is favorable that the rear haze is greater than or equal to 5%, more favorable to be greater than or equal to 7%, and even more favorable to be greater than or equal to 10%. Also, from the viewpoint of transparency, it is favorable that the rear haze is less than or equal to 90%, and more favorable to be less than or equal to 80%. In the specification, "rear haze" represents reflected light deviated from the normally reflected light by 2.5 degrees or more among the entire reflected light in units of percentage.

Image light projected from a projector and incident on a screen is scattered in the liquid layer, to form an image to be displayed so that an observer on the side of the projector can visually recognize the image in the case of the reflective transparent screen; or the observer on the opposite side to the projector can visually recognize the image in the case of the transmissive transparent screen.

EXAMPLES

In the following, examples and comparative examples will be listed and specifically described. Note that the present invention is not limited to these. Examples 1 to 4 show working examples, Comparative Examples 1 and 2 show comparative examples.

<Evaluation Method>
(Young's Modulus, Acoustic Velocity of Longitudinal Wave, Density)

Young's modulus E and the acoustic velocity V of a glass sheet, and the acoustic velocity of longitudinal wave V of a glass sheet composite were measured with a test sample (60 mm long, 12 mm wide, and 0.5 mm-1 mm thick), at 25° C., by an ultrasonic pulse method described in a Japanese Industrial Standard (JIS-R 1602-1995), by using "DL35PLUS" manufactured by Olympus Corporation. As the acoustic velocity of longitudinal wave of the glass sheet composite, the acoustic velocity in the sheet thickness direction was measured. The density p of the glass sheet was measured at 25° C. using Archimedes' method (implemented in "AUX320" manufactured by Shimadzu Corporation).

(Resonance Frequency)

The loss coefficients of the glass sheet and the glass sheet composite were measured at 25° C. by using the same test sample as in the above measurement, and a resonance-method-based internal friction measuring device ("JE-HT" manufactured by Nihon Techno-Plus Corporation). Specifically, an AC voltage in the range of 600 Hz-3000 Hz was continuously applied to the test sample so as to bend the glass substrate, to cause free vibration in the primary mode, and to measure change of the vibration amplitude. A frequency at which the maximum vibration amplitude was observed was set as the resonance frequency f.

(Loss Coefficient)

A value represented by {W/f} was defined as the loss coefficient where f represents the resonance frequency of the material obtained by the measurement described above, and W represents a frequency width between points decreased by −3 dB from the maximum amplitude (namely, points at the maximum amplitude −3 dB). For a test sample to which the above method is not applicable due to having a non-symmetric peak shape, damping time of vibration amplitude was measured when the vibration had been stopped in a resonance state, and using the damping time, the loss coefficient was calculated.

(Viscous Coefficient)

The viscous coefficient of the liquid layer was measured at 25° C. by using a rotational viscometer ("RVDV-E" manufactured by Brookfield AMETEK, Inc.).

(Surface Tension)

The surface tension of the liquid layer was measured by the following method. A metal ring lifted in parallel to a testing liquid at 25° C. was sunk into the liquid, and then, the ring was gradually pulled up in the vertical direction. At this time, the peak of the force applied by the liquid membrane was measured to calculate the surface tension.

Example 1

As a first glass sheet, a glass sheet 1 having the size of 12 mm×60 mm×0.5 mm was prepared. To form a liquid layer, liquid of ion-exchanged water (refractive index 1.33) having spherical particles of titanium oxide (spherical titania) (mean particle diameter 400 nm, refractive index 2.49, and 1.0 vol %) dispersed therein, was applied onto the glass sheet 1. Then, as a second glass sheet, a glass sheet 2 having the size of 12 mm×60 mm×0.5 mm was adhered to the glass sheet 1. Thus, a glass sheet composite having the size of 12 mm×60 mm×1 mm was obtained. The compositions (where a percentage represents mass % in terms of oxide basis) and the physical property values of the glass sheet 1 and the glass sheet 2 are as follows:

(Glass Plate 1)
Composition: 60% $SiO_2$; 17% $Al_2O_3$; 8% $B_2O_3$; 3% MgO; 4% CaO; and 8% SrO
Density: 2.5 g/cm$^3$
Young's modulus: 77 GPa
Specific modulus: $3.1 \times 10^7$ m$^2$/s$^2$ (Glass Sheet 2)
Composition: 61.5% $SiO_2$; 20% $Al_2O_3$; 1.5% $B_2O_3$; 5.5% MgO; 4.5% CaO; and 7% SrO;
Density: 2.7 g/cm$^3$
Young's modulus: 85 GPa
Specific modulus: $3.2 \times 10^7$ m$^2$/s$^2$ The obtained glass sheet composite was evaluated as follows.

Color tone reproducibility: this property was evaluated by the following evaluation criteria, with respect to color of rectilinearly transmitted light (YI) measured by a spectrophotometer using a D65 light source described in a Japanese Industrial Standard (JISZ8720:2012).
Good: $0 \leq YI < 1.0$
Fair: $1.0 \leq YI < 2.0$
Poor: $2.0 \leq YI$ Light scattering: this property was evaluated by the following evaluation criteria, with respect to a haze value H (%) measured by using a haze meter compliant with a Japanese Industrial Standard (JIS K7136:2000).
Excellent: $15 \leq H$
Good: $10 \leq H < 15$
Fair: $5 \leq H < 10$
Poor: $0 \leq H < 5$ Off-transparency: this property was evaluated by the following evaluation criteria, with respect to a visible light transmittance T (%) measured by a spectrophotometer using a D65 light source described in a Japanese Industrial Standard (JISZ8720:2012).
Excellent: $90 \leq T$
Good: $85 \leq T < 90$
Fair: $80 \leq T < 85$
Poor: $0 \leq T < 80$ Evaluation as diaphragm: this property was evaluated by the following evaluation criteria, with respect to an acoustic velocity of longitudinal wave V m/s at 25° C., measured by using an ultrasonic pulse method described in a Japanese Industrial Standard (JIS-R 1602-1995), applied to a test sample (60 mm long, 12 mm wide, and 0.5 mm-1 mm thick), using "DL35PLUS" manufactured by Olympus Corporation.
Good: $5.0 \times 10^3 \leq V$
Fair: $1.0 \times 10^3 \leq V < 5.0 \times 10^3$
Poor: $V < 1.0 \times 10^3$ Examples 2-4 and Comparative Examples 1-2

Respective glass sheet composites were obtained as in Example 1 except for the particles used in the liquid layer, as specified in Table 1, specifically as follows:

Example 2

A glass sheet composite was obtained as in Example 1, except that the particles used in the liquid layer were changed to hollow particles (hollow titania having the particle diameter of 800 nm and the shell thickness of 100 nm).

Example 3

A glass sheet composite was obtained as in Example 1, except that the particles used in the liquid layer were changed to secondary particles of zirconia having the particle diameter of 0.3 µm (formed of primary particles having the particle diameter of 90 nm, aggregated to become porous particles having anisotropic shapes).

Example 4

A glass sheet composite was obtained as in Example 1, except that the liquid layer was changed to propylene glycol.

Comparative Examples 1-2

A glass sheet composite was obtained as in Example 1, except that the particles used in the liquid layer were changed to spherical silica (having the respective mean particle diameters of 50 nm and 3 µm, and the refractive index of 1.46).

Note that in these examples, the liquid layer may contain a light absorbing material as described above.

Also, in these examples, a surface of at least one of the first glass sheet and the second glass sheet may have a rugged structure.

Also, in these examples, a surface or surfaces of the first glass sheet and/or the second glass contacting the liquid layer may have a rugged structure.

Configurations and evaluation results of the glass sheet composites obtained in Examples 1-4 and Comparative examples 1-2 are shown in Table 1.

TABLE 1

|  |  | Ex. 1 | Ex. 2 | Ex. 3 | Ex. 4 | Comp. Ex. 1 | Comp. Ex. 2 |
|---|---|---|---|---|---|---|---|
| Glass sheets | First glass sheet | Glass sheet 1 | Glass sheet 1 | Glass sheet 1 | Glass sheet 1 | Glass sheet 1 | Glass sheet 1 |
|  | Sheet thickness (mm) | 0.5 | 0.5 | 0.5 | 0.5 | 0.5 | 0.5 |
|  | Second glass sheet | Glass sheet 2 | Glass sheet 2 | Glass sheet 2 | Glass sheet 2 | Glass sheet 2 | Glass sheet 2 |
|  | Sheet thickness (mm) | 0.5 | 0.5 | 0.5 | 0.5 | 0.5 | 0.5 |
| Liquid layer | Type of particle (Mean particle diameter) | Spherical titania (0.4 µm) | Hollow titania (0.8 µm) Shell thickness 0.1 µm | Spherical zirconia (0.3 µm) | Spherical titania (0.4 µm) | Spherical silica (0.05 µm) | Spherical silica (3 µm) |

TABLE 1-continued

|  |  | Ex. 1 | Ex. 2 | Ex. 3 | Ex. 4 | Comp. Ex. 1 | Comp. Ex. 2 |
|---|---|---|---|---|---|---|---|
|  | Refractive index of particle | 2.49 | 2.15 | 2.11 | 2.49 | 1.46 | 1.46 |
|  | State of particles | Monodispersed | Monodispersed | Dispersed aggregates of particles (having 90-nm primary particle diamter) | Monodispersed | Monodispersed | Monodispersed |
|  | Medium | Water | Water | Water | Propylene glycol | Water | Water |
|  | Refractive index of medium | 1.33 | 1.33 | 1.33 | 1.43 | 1.33 | 1.33 |
|  | Refractive index difference between particle and medium | 1.16 | 0.82 | 0.78 | 1.06 | 0.13 | 0.13 |
|  | Layer thickness | 5 µm | 5 µm | 5 µm | 5 µm | 5 µm | 5 µm |
|  | Viscous coefficient (Pa · s) | 1.2 | 1.2 | 1.2 | 48 | 1.2 | 1.2 |
|  | Surface tension (mN/m) | 73 | 73 | 73 | 36 | 73 | 73 |
| Glass sheet composition | Glass sheet composite | Two sheets (1.0 mm thick) | Two sheets (1.0 mm thick) | Two sheets (1.0 mm thick) | Two sheets (1.0 mm thick) | Two sheets (1.0 mm thick) | Two sheets (1.0 mm thick) |
|  | Loss coefficient | 3.2 | 3.2 | 3.2 | 3.1 | 3.2 | 3.2 |
|  | Acoustic velocity of longitudinal wave (m/s) | $6.1 \times 10^3$ | $6.1 \times 10^3$ | $6.1 \times 10^3$ | $6.1 \times 10^3$ | $6.1 \times 10^3$ | $6.1 \times 10^3$ |
| Color tone reproducibility |  | Good | Good | Good | Good | Poor | Good (nonuniformity occurred) |
| Light scattering |  | Excellent | Excellent | Excellent | Excellent | Fair | Poor (nonuniformity occurred) |
| Off-transparency |  | Good | Excellent | Excellent | Good | Excellent | Poor |
| Evaluation as diaphragm |  | Good | Good | Good | Good | Good | Good |

As shown in Table 1, every glass sheet composite in Examples includes a first glass sheet, a second glass sheet, and a liquid layer sandwiched between the first glass sheet and the second glass sheet, in which the loss coefficient and the acoustic velocity of longitudinal wave of the glass sheet composite, and the viscous coefficient and the surface tension of the liquid layer were set in the specific ranges described in the present invention, and particles having specific mean particle diameter described in the present invention are contained in the liquid layer. It was understood, therefore, that every glass sheet composite in Examples has good acoustic performance, has good color tone reproducibility, transparency, and light scattering, and excels in the screen function, compared to the glass sheet composites in Comparative examples.

INDUSTRIAL APPLICABILITY

A glass sheet composite according to the present invention has a high acoustic velocity of longitudinal wave, and a high loss coefficient. Therefore, the glass sheet composite can be suitably used as the diaphragm used in a loudspeaker, a microphone, an earphone, a mobile device, and the like; and in a reflected or transmissive transparent screen using the diaphragm.

As above, the preferable embodiments have been described in detail. Note that the present invention is not limited to the above embodiments, which may be changed and replaced in various ways without departing from the scope described in the claims.

This application is based upon and claims the benefit of priority of Japanese Patent Application No. 2017-065976 filed on Mar. 29, 2017, the entire contents of which are hereby incorporated by reference.

DESCRIPTION OF REFERENCE NUMERALS AND SIGNS

10: glass sheet composite
11: first glass sheet
12: second glass sheet
13: glass sheet C
16: liquid layer
30: frame
31: sealing material

The invention claimed is:

1. A glass sheet composite, comprising:
a first glass sheet;
a second glass sheet; and
a liquid layer sandwiched between the first glass sheet and the second glass sheet,
wherein:
the glass sheet composite has a loss coefficient greater than or equal to $1\times10^{-2}$ at 25° C., and an acoustic velocity of longitudinal wave greater than or equal to $5.0\times10^3$ m/s in a sheet thickness direction at 25° C.;
the liquid layer has a viscous coefficient of $1\times10^{-4}$-$1\times10^3$ Pa·s at 25° C., and a surface tension of 15-80 mN/m at 25° C.; and
the liquid layer comprises particles whose mean particle diameter is 0.3-1 µm.

2. The glass sheet composite as claimed in claim 1, wherein the liquid layer comprises a medium, and a difference between a refractive index of the medium and a refractive index of the particles is greater than or equal to 0.15.

3. The glass sheet composite as claimed in claim 1, wherein a volume ratio of the particles is 0.1-5 vol % when an entirety of the liquid layer in volume is taken as 100 vol %.

4. The glass sheet composite as claimed in claim 1, wherein the particles include is a particle having an anisotropic shape.

5. The glass sheet composite according to claim 1, wherein the particles are particles selected from the group consisting of hollow particles, porous particles, and a mixture thereof.

6. The glass sheet composite as claimed in claim 1, wherein the liquid layer further comprises a light absorbing material.

7. The glass sheet composite as claimed in claim 1, wherein a surface of at least one of the first glass sheet and the second glass sheet has a rugged structure.

8. A diaphragm, comprising:
   the glass sheet composite as claimed in claim 1; and
   a vibrating element.

9. An image projection structure, comprising:
   the diaphragm as claimed in claim 8.

10. An image projection structure, comprising:
    the glass sheet composite as claimed in claim 1.

\* \* \* \* \*